United States Patent
Na

(12) 
(10) Patent No.: US 6,728,759 B1
(45) Date of Patent: Apr. 27, 2004

(54) SYSTEM AND METHOD OF COMPOSING SEARCH FREE MAIL

(76) Inventor: Hong Chan Na, 1350 Beverly Rd. # 402, McLean, VA (US) 22101

( * ) Notice: Subject to any disclaimer, the term of this patent is extended or adjusted under 35 U.S.C. 154(b) by 0 days.

(21) Appl. No.: 09/542,521

(22) Filed: Apr. 3, 2000

Related U.S. Application Data

(63) Continuation-in-part of application No. 09/510,346, filed on Feb. 22, 2000, now abandoned.

(51) Int. Cl.[7] .......................... G06F 15/16; G06F 17/00
(52) U.S. Cl. ..................................... 709/206; 707/104.1
(58) Field of Search .................................. 709/203, 206, 709/217–219, 245; 713/200–202; 707/104.1

(56) References Cited

U.S. PATENT DOCUMENTS

| | | | | |
|---|---|---|---|---|
| 5,812,776 A | * | 9/1998 | Gifford ........................ | 709/217 |
| 5,928,333 A | * | 7/1999 | Landfield et al. ........... | 709/245 |
| 5,944,787 A | * | 8/1999 | Zoken ......................... | 709/206 |
| 5,950,200 A | * | 9/1999 | Sudai et al. .................... | 707/9 |
| 5,968,117 A | * | 10/1999 | Schuetze .................... | 709/206 |
| 5,974,453 A | * | 10/1999 | Andersen et al. ........... | 709/220 |
| 5,987,508 A | * | 11/1999 | Agraharam et al. ........ | 709/217 |
| 6,182,148 B1 | * | 1/2001 | Tout ............................ | 709/245 |
| 6,212,552 B1 | * | 4/2001 | Biliris et al. ................. | 709/206 |
| 6,438,584 B1 | * | 8/2002 | Powers ....................... | 709/206 |
| 6,466,969 B1 | * | 10/2002 | Bunney et al. ............. | 709/206 |
| 6,508,710 B1 | * | 1/2003 | Paravia et al. ................ | 463/42 |
| 6,654,779 B1 | * | 11/2003 | Tsuei .......................... | 709/101 |

\* cited by examiner

*Primary Examiner*—Jack B. Harvey
*Assistant Examiner*—Douglas Blair
(74) *Attorney, Agent, or Firm*—Richard C. Litman

(57) ABSTRACT

A system and method which allows users to compose search free mail via a native identifier scheme. Users access a plurality of native oriented domains identified by a country code. The system is connected to an Internet or web-based environment as a global registered internet host for composing search free user e-mail and allowing government (i.e. IRS, Federal, State, Local, etc.) and private industries (i.e. Telephone, Gas, Electricity, Water, etc. Companies) single point transmission access via a native user's mailbox. The network system is operable to be connected with a plurality of normalized native domains which normalizes transaction invoices between distinct native domains independent of language differences via arabic standardized numeric codes. Each native domain is a architectural product of a parent or global host identified as IQIQIQ.com or IQIQIQ.123 for exemplary purposes only. A product or native domain of the global host for Korea (KR) would be identified accordingly as IQIQKR.123, etc. Users who are native to Korea would access their native domain via the global host by a method of doing business which utilizes native identifiers (i.e. Social Security Number (#), EIN#, Driver's License # and/or a Telephone #).

11 Claims, 7 Drawing Sheets

Fig. 1

IQIQIQ | Home Mail Registration

14 — PLEASE SELECT FROM FOLLOWING NATIVE NUMBER ASSIGNED TO INDIVIDUAL FOR YOUR DYNAMICAL ASSIGNED NETWORK ADDRESS, I.E., SOCIAL SECURITY NUMBER, DRIVER'S LICENSE NUMBER, EIN NUMBER, TELEPHONE NUMBER.

AREA#   CLASS#   NATIVE#
15a      15b      15c

16

COUNTRY

NAME OF BUSINESS

18

PLEASE FILL OUT FOLLOWING FIELD TO BETTER SERVICE YOU AS A MEMBER AT OUR SITE.

19

SEX
AGE
OCCUPATION
ANNUAL INCOME
HOBBY

| IQIQIQ | Home Mail Registration |

OCCUPATION       NAME OF BUSINESS

*62*       *64*

*14* — INPUT CLASSIFICATION NUMBER | INPUT AREA# ONCE CLASS# IS NOT AVAILABLE | SELECT CITY ONCE AREA# IS NOT AVAILABLE

*15a*    *15b*    *15c*

SEARCH RESULT

*66* — BUSINESS : BUSINESS NAME/HOME MAIL ADDRESS
FAMILY : NAME/HOME MAIL ADDRESS
PERSONAL : NAME/HOME MAIL ADRESS

*Fig. 2C*

SYSTEM AND METHOD OF COMPOSING SEARCH FREE MAIL

CROSS-REFERENCE TO RELATED APPLICATIONS

This application is a continuation-in-part of the U.S. Non-provisional Patent Application Ser. No. 09/510,346, filed Feb. 22, 2000 now abandoned.

BACKGROUND OF THE INVENTION

1. Field of the Invention

The present invention relates generally to Internet based applications. More specifically, the invention is a global Internet system and method for composing and linking search free e-mail within the system independent of a user's native language via native identifiers.

2. Description of the Related Art

Various internet related systems and methods have been devised for allowing communications between servers or client based systems utilizing the universal resource locator (URL) standard. These methods have included business methods which conduct on-line interchanges between distinct addressing schemes. Two popular site communication methods. Both forms involve obtaining a specific address which requires registration with a server, subject to address availability. In the conventional e-mail system, e-mail addresses are denoted by some combination of alphanumeric symbols denoting a user's identity ("user identifier"; i.e. the bold and underline part in the following: johnsmith@aol.com, combined with server ("host identifier"; i.e., the bold and underline part. following johnsmith@aol.com). Within a specific server, the host identifier element remains constant in all users' addresses, but the user identifier changes to denote different e-mail addresses. Typically, registration of an e-mail address is done by selecting a combination of a user's personal name, or by using some combination of a user's personal name plus a modifier placed before or at the end of that user's name, forming a user identifier string that defines the availability of the particular e-mail address for registration. Host identifier remains unchanged and constant. Thus, meaningless combinations of alphabets and/or numbers are avoided if at all possible for e-mail addresses because such addresses tend to be difficult to remember and use.

Also, due to unavoidable occurrences of the same or similar names of users, e-mail addresses using combination's of user's names, with or without modifiers are often pre-registered and unavailable for registration. In a web-site system, web-site addresses are also similarly denoted by some combination of alphanumeric symbols denoting a user's identity via the URL standard ("user identifier"; i.e., the bold and underlined part in the following: http://anyname.aol.com), preceded by constants ("precursor"; i.e., the bold part in the following: http://www.anyname.aol.com), and combined with server address ("host identifier"; i.e., the bold and underlined part in the following: http://www.anyname.aol.com) at the end.

Within a specific server, the host identifiers and the precursors remain unchanged, but the user identifier changes to denote a specific or distinct web-site address. Registration of website addresses is therefore done in a similar fashion to the registration of e-mail addresses. The user identifier is determinative of the availability of the domain names. Since many users according to conventional methods as described herein below opt to use their personal names or combinations of their names and some other simple modifier to register their domain names, the availability of a website address incorporating individual or organization names in general tends to be low. Furthermore, cyber-squatting—the act of registering domain names under another's name in anticipation of impending future need of such domain names by another person or entity usually for monetary gain—has worsened the e-mail and website address availability situation.

Although cyber-squatting is prevalent, a victim of this tactic always has an option to use a numerical domain name system (DNS) entry, or some other complex available scheme, even though such website schemes tend to be too long or difficult to remember and/or use. A system and method of composing search free e-mail within an internet based environment which utilizes simple and easily remembered native identifiers germane to an individual within a cultural domain as herein described is lacking in conventional techniques.

For example, U.S. Pat. No. 5,745,683 issued to Lee et al. discloses a system and method for allowing disparate naming service providers to dynamically join a naming federation which provides for four kinds of name services (i.e. atomic name, compound name, partial composite name and composite name) for arbitrary naming of directories in computer systems and/or service providers. The environment in which the system is used encompasses the general distributed computing system, wherein general purpose computers, work-stations, or personal computers are connected via communication links of various types, notably a client-server arrangement.

U.S. Pat. No. 5,751,961 issued to Smyk discloses an integrated internet system for translating logical addresses of internet documents to physical addresses using an integrated service control point (ISCP). An ISCP gateway connects an internet to the internet where call processing record (CPR's) are generated and stored in a database. The CPR's translate logical addresses in the uniform resource language or universal resource locator (URL) standard to physical worldwide Web (WWW) addresses in the URL standard.

U.S. Pat. No. 5,764,906 issued to Edelstein et al. discloses a universal denotation, request and delivery system which allows a user to locate information on a distributed computer system or network such as the Internet by knowing or guessing a mnemonic "alias" of an electronic resource, without a direct data link to a URL. The system hardware includes a client computer, a local server, a central registry server, a value added server, and a root server. The aliasing feature aids a user in obtaining document resources under adverse conditions and for updating local servers.

U.S. Pat. No. 5,812,776 issued to Gifford discloses a method of providing Internet pages by mapping a telephone number to a URL and returning the same via a redirect command. The process includes client service sessions over the Internet involving links to hypertext files. The telephone number links to a target page via a URL identifier.

U.S. Pat. No. 5,872,779 issued to Vaudreuil discloses a complex communication system for private addressing plans using community addressing. A network hub system is connected to a communication messaging system which provides both public and private access ports to a virtual messaging system having protocol oriented translation features. The system requires an extensive list of hardware including multi-linked computer systems and gateways for transmitting data from select servers or databases which seek to remedy complications interfacing with voice messaging systems—including inherent message tracking and management features, directed to designations such as privacy, urgency, delivery, confirmation, etc. This system addresses different problems than that of the invention as herein described.

U.S. Pat. No. 5,878,219 issued to Vance, Jr. et al. discloses a system for integrating access to proprietary and internet resources using a single Web-based client wherein subscribers enter selections regarding the type of information they would like to retrieve. Relevant information is retrieved from the Internet using the Uniform Resource locator (URL) addressing scheme of the Internet to locate selective information. An on-line service is configured to retrieve information based on the extensions to the URL addressing scheme which provides data access to both the Internet and a proprietary system.

U.S. Pat. No. 5,928,333 issued to Landfield et al. discloses an electronic mail management system for operation on a host computer system. The system utilizes an "alias" database naming scheme and provides a fire-wall between private and public networks to prevent unauthorized intrusions within individual host systems. Each of the fire-wall host systems provides a graphical user interface which allows for proactive maintenance of mail message queues. A user has direct access to each mail message, and can delete or reroute a bounced message listed in a specific directory.

U.S. Pat. No. 5,930,479 issued to Hall discloses a communications addressing system for sending and receiving authorized messages from a sender to a recipient between two servers. The system makes use of a channelized address to send a message from a sender to a recipient. The channelized address comprises a common address portion that indicates the identity of the recipient network and a channel identifier portion for verifying that the message is authorized for delivery to a recipient via a URL standard.

U.S. Pat. No. 5,974,453 issued to Andersen et al. discloses a method and apparatus for translating a static identifier including a telephone number into a dynamically assigned network address. A dynamic database address is used to access a dynamic database. A static identifier corresponding to the device which is contacted is linked with a dynamic address from the dynamic database such as a telephone number. The translation aspect is germane only to assigning a dynamic address to a static identifier or internet domain name system (DNS). A similar client sensitive name resolution system using DNS is disclosed in U.S. Patents issued to Lim et al (U.S. Pat. No. 6,014,660) and Ronen (U.S. Pat. No. 6,026,441).

Other patents of general significance to the system and method as herein described are those issued to Agraharam et al. (U.S. Pat. No. 5,987,508), Freeman (U.S. Pat. No. 6,020,980) and Bloomfield (U.S. Pat. No. 6,025,931) which teach conventional facsimile and telephone conversion features. The Japanese Patent granted to Kazunari et al. disclose a system of interconnected local area networks which utilizes a file transfer protocol (FTP)/IP inter-network connection.

None of the above inventions and patents, taken either singularly or in combination, is seen to describe the instant invention as claimed. Thus, a system and method of composing search free mail solving the aforementioned problems is desired.

SUMMARY OF THE INVENTION

The system and method of composing search free mail according to the invention utilizes a native identifier scheme which allows user access to a plurality of native oriented domains identified by a country code. The system is connected to an internet or web-based environment as a global registered internet host for composing search free user e-mail and allowing government (i.e. IRS, Federal, State, Local, etc.) and private industries (i.e. Telephone, Gas, Electricity, Water, etc. Companies) single point transmission access via a native user's mailbox.

The network system used is operable to be connected with a plurality of normalized native domains which normalizes transaction invoices between distinct native domains independent of language differences via arabic standardized numeric codes. Each native domain is a architectural product of a parent or global host identified as IQIQIQ.com or IQIQIQ.123 for exemplary purposes only. A product or native domain of the global host for Korea (KR) would be identified accordingly as IQIQKR.123, etc. Users who are native to Korea would access their native domain via the global host by a method which utilizes native identifiers (i.e. Social Security Number (#), EIN#, Driver's License # and/or a Telephone #)

The system allows for a plurality of computer user interfaces with a respective native domain which includes a plurality of internal messaging elements for concurrently accessing client or object oriented devices in real time. This allows a user to verify, receive and transmit data while on-line. A searching mechanism provides a user with native user data stored within at least one database facility of a native domain, virtual host or hub system.

The method of composing search free mail within the Internet or web-based environment generally include the steps of:

(a) registering at least one global host for Internet based applications and a native computer user interface, (b) configuring said host with a plurality of native domains for native user registration, the plurality of domains having a native country code indicator and a common identifier indicative of said at least one global host, (c) providing a mail registering procedure for native user input data, the registering procedure including:
  (1) inputting selective native user data, said data being native identifiers comprising a social security number, driver's license number, EIN number and a telephone number,
  (2) designating and/or inputting a country,
  (3) designating and/or inputting at least one business name, and
  (4) inputting personal native information of sex, age occupation, annual income and a hobby, (d) providing a mail registering confirmation procedure for native user input data, the confirmation registering procedure including:
  (1) selecting between two alternatives yes or no for confirming native number inputs according to the providing step (c) (1),
  (2) inputting a password according to a predetermined number of characters,
  (3) re-entering password to confirm (e) determining a home mail address and obtaining a mail box germane to a native domain of said plurality of native domains, wherein said domain has an identifier portion common to said at least one global host, (f) entering a webpage related to said home mail address of the determining step (e).

(g) providing a searching procedure for locating data on a native user, said searching procedure includes:

(1) inputting data for an occupation and a business (2) inputting at least one native identifier.

(h) providing search results.

Accordingly, it is a principal object of the invention to provide an internet based search free e-mail system and method for composing e-mail based on easy to remember native identifiers germane to a cultural identified domain.

It is another object of the invention to provide a system and method of composing search free e-mail which will unify global business transaction regardless of language difference in an internet or web-based environment.

It is a further object of the invention to provide a system and method for composing search free e-mail that assures the availability of native address to virtually all users that is resistant to cyber-squatting.

Still another object of the invention is to provide a system and method of composing search free e-mail which promotes business transactions via a single point connection.

Further still, another object of the invention is to provide a system and method which enables native users to use modem based transactions involving invoices, bills and other verifiable transactions.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is diagrammatic view of the system for composing search free e-mail according to the present invention, illustrating a global internet or web-based environment.

FIG. 2A is a diagrammatic illustration of a registration

FIG. 2C is a diagrammatic illustration of a searching procedure within a United States (US) native domain according to the invention.

DETAILED DESCRIPTION OF THE PREFERRED EMBODIMENTS

Figure 1:
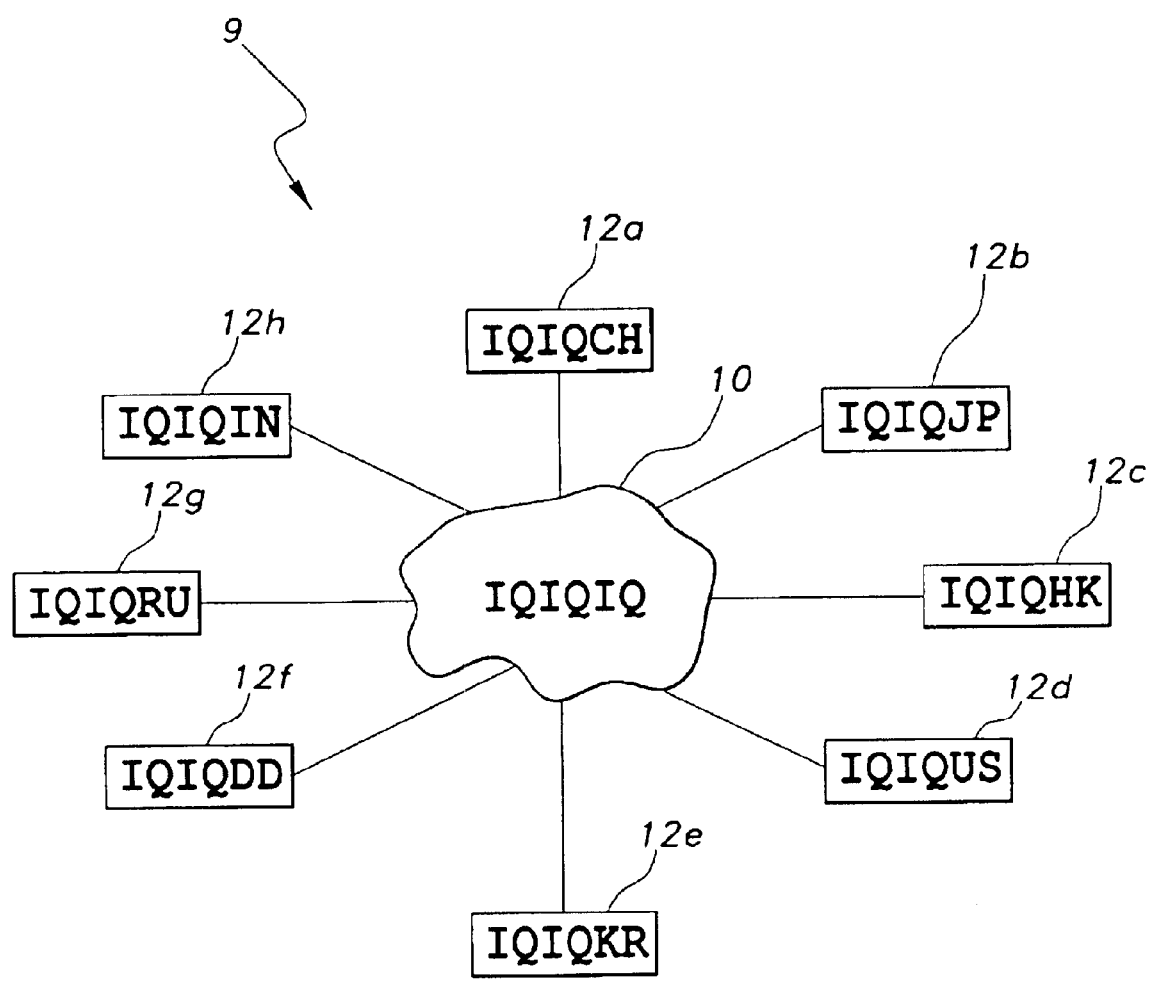
Figure 2B:
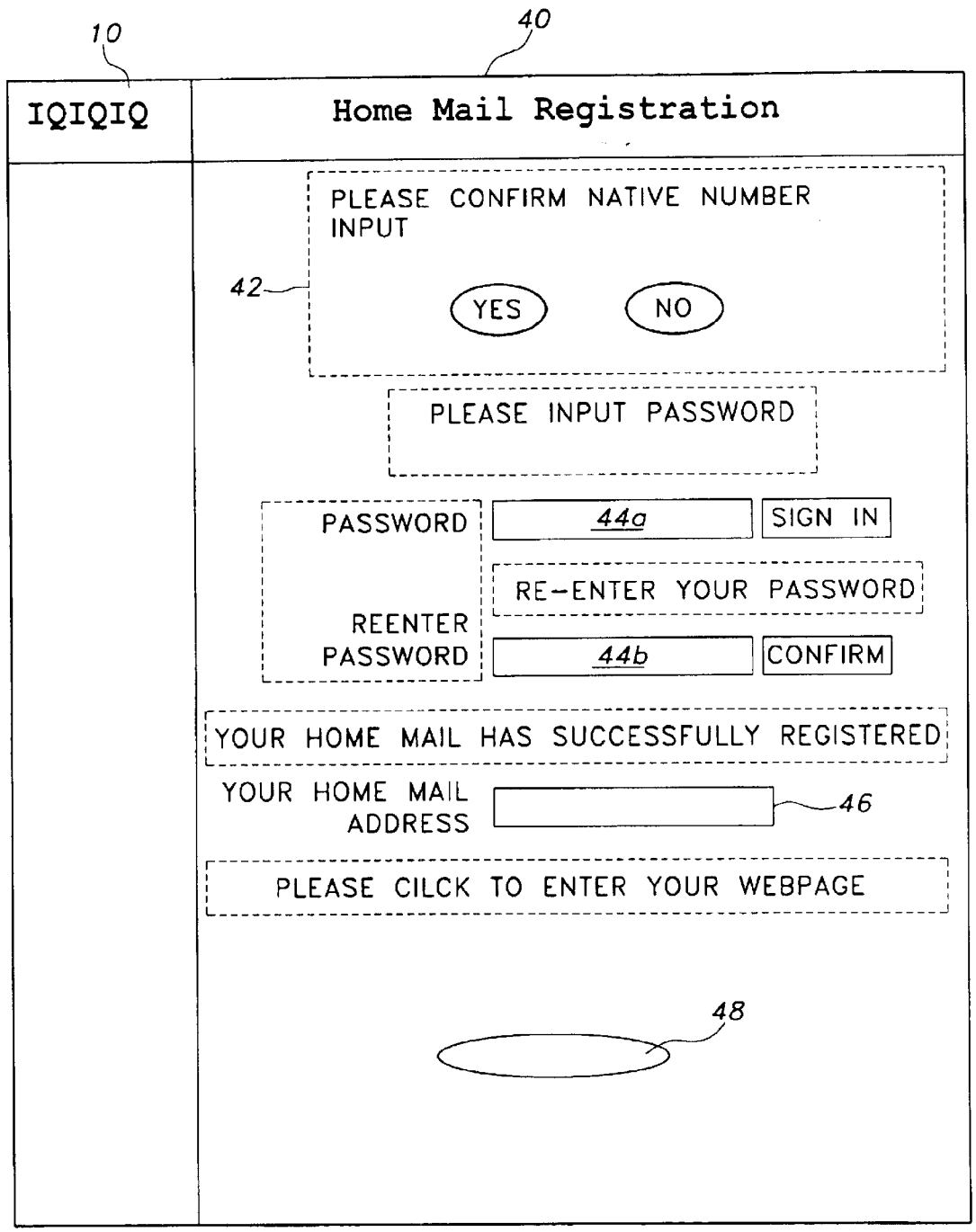
FIG. 2B is a diagrammatic illustration of a confirmation procedure according to the invention.

The present invention is directed to a global mail system 9 connected to an internet or web-based environment for composing search free user e-mail. The preferred embodiments of the present invention are depicted in FIGS. 1–5, and are generally referenced by numerals 6 and 7, comprising:

As diagrammatically illustrated in FIG. 1, a network system 10 is operable to be connected with a plurality of normalized native domains 12a, 12b, 12c, 12d, 12e, 12f, 12g and 12h, etc., respectively. Each respective native domain 12a, 12b, 12c, 12d, 12e, 12f, 12g and 12h provide computer user interfaces accessible only via native identifiers 14 (i.e Social Security Number (#), Driver's License #, EIN #, and a Telephone #) as shown if FIG. 2A. Form or interactive storage means 20 is a user database interface within the network 10 and respective native domain 12 which retains in storage data such as a country designation or code 16, business name 18 and personal user data 19 (i.e sex, age, occupation, annual income and hobby) at least. The selective native identifier is recorded within three fields (i.e. Area # 15a, Class# 15b and Native # 15c). The resulting field is a permutation of user specific input data which is used to determine a native mail number.

As diagrammatically illustrated in FIG. 2B, form or means 40 is shown, and is generated in a similar fashion as described for form 20 in FIG. 2A. Numerous software utilities can be used to develop similar form-like database interfaces. Once transaction data is obtained by a user confirmation of the native user input, data is stored in a conditional (yes or no) storage register 42 including input registers for user defined passwords 44a and 44b. Register 44b affirms a previous password entry and home mail registration concludes with the production of a home mail address via register 46 germane to a respective native domain 12 and corresponding to a user's native identifiers 14. The country code scheme used for various countries identified as native domains 12 such as China (CH) 12a, Japan (JP) 12b, Honk Kong (HK) 12c, United States (US) 12d, Korea(KR) 12e, Germany (DD) 12f, Russia (RU), 12g, Indonesia (IN) 12h, etc is preferably the WIPO Standard. Once the native user is registered a clickable link 48 activates a webpage resource for the registered user.

As diagrammatically illustrated in FIG. 2C, another on-line database register form or means 60 is shown which provides a search register on occupation 62, name of business 64 and native identifiers 14 or generated fields 15a, 15b and 15c. Text search routine of various sorts are readily available for accessing specific data as herein disclosed, and similar capability can beg provide for generating results 66 according to specific search commands.

Figure 3:
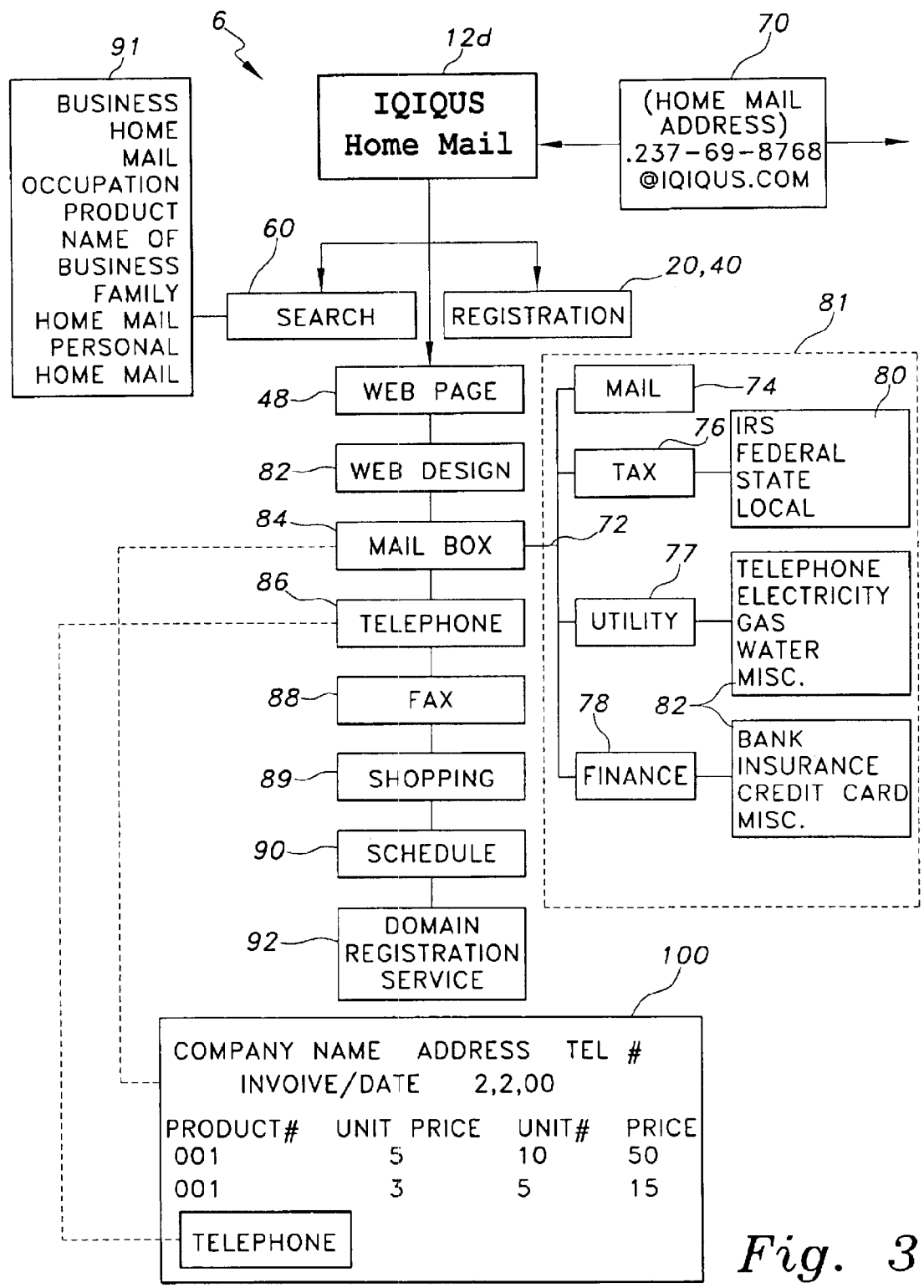
FIG. 3 is a block diagram of the system and method of, composing search free e-mail within a US native domain according to a first embodiment of the invention.

As diagrammatically illustrated in FIG. 3, the system and method for composing search free home mail according to the first embodiment is shown for a native domain 12d which identifies United States wipo standard. A home mail address is identified as exemplary using a native Social Security Number. The preferred logical designation for the domain 12d includes an identifier IQIQ common with the global network 10 (IQIQIQ.com) as previously discussed above. This particular identifier scheme will become more readily apparent, particularly in resolving business transaction between two distinct native domains 12. As shown in FIG. 3, the IQIQUS native domain 12 has a single point data, transmission access point 72 for receiving and transmitting selective data (i.e. mail 74, taxes 76, utilities 77, finances 78 or similar invoices) from government 80 and private corporations 82. In a similar fashion, each respective plurality of normalized native domains 12 will have a single communication connection point 72 for transmitting and receiving selective data via module 81. Other home mail features for each respective native domain 12 such as IQIQUS 12d include a distinct web design feature 82, mail box 84, telephone or alphanumeric touch pad capability 86, fax 88, on-line shopping 89 and scheduling 90 including domain registration services 92. Similar capability is developed for business, personal and family mail as indicated in module 91. As indicated by dotted lines L and S, a first company invoice 100 is shown which provides internal messaging capability via element 101 for concurrent interactive communication with a company. In such an instance data can be resubmitted via a native user mailbox 84 while on-line.

Figure 4A:
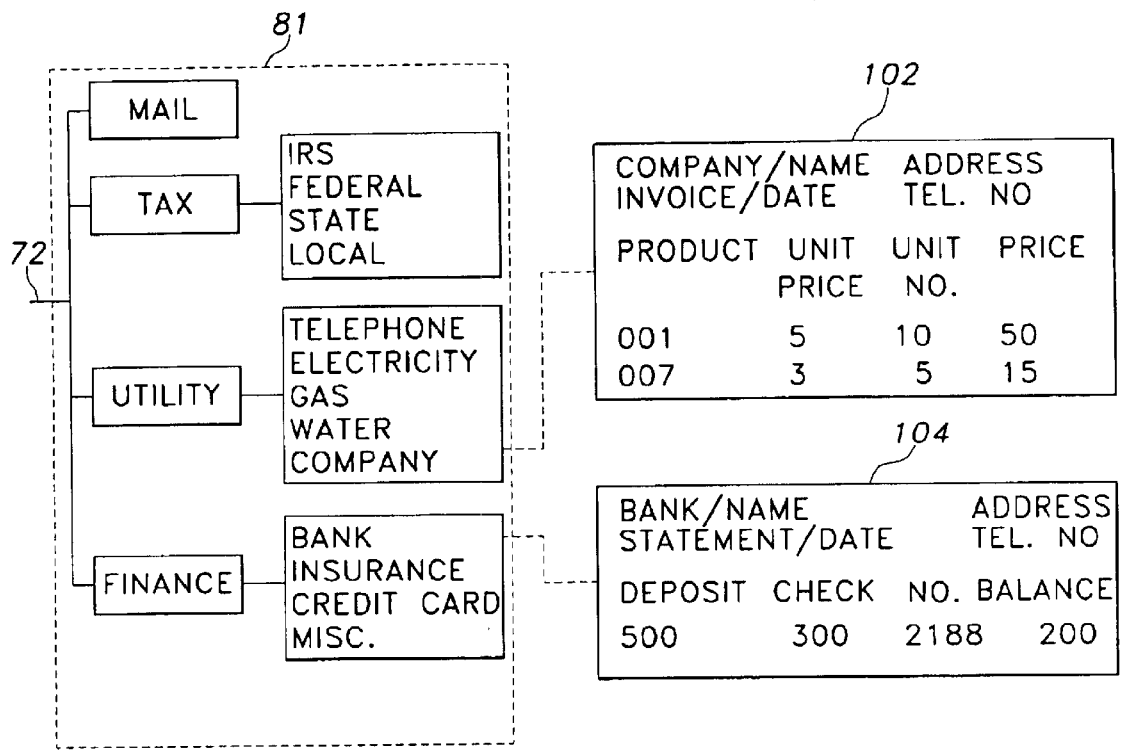
FIG. 4A is a block diagram illustrating a single point link for business transactions with government and private corporations according to the invention.

As shown in FIG. 4A similar invoice transmissions are illustrated via a second invoice 102 with purchase date from a target company and a third invoice 104 bank transaction data thereon. Such data can be selectively transmitted by a government of private corporation to any user within the network system 10 via home (business, family, personal, etc.) mail through a single data transmission point 72. This interface includes internal messaging capabilities as identified in FIG. 3 for concurrent and real time activity between at least two distinct native users, and/or a native user and a company. The native domains can be identified as a plurality of virtual host systems and/or hub, systems interconnected within a an internet or web-based system.

Figure 4B:
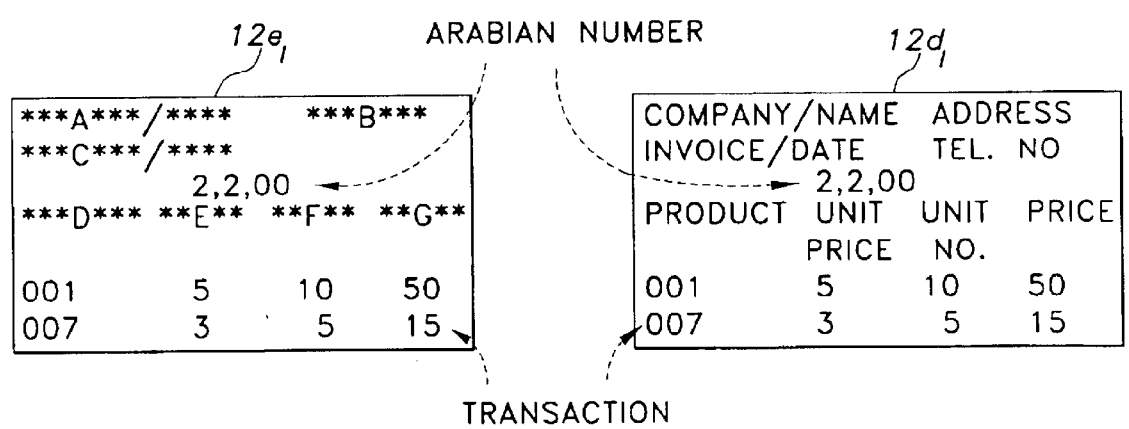
FIG. 4B is a transaction diagram according to the invention, illustrating normalized global business transactions independent of native languages.

Normalization business transactions are directed between, distinct selective native domains eg. (12d and 12e) where language differences can be a potential conflict. As illustrated in FIG. 4B a business translation is shown between invoices of the designated domains 12d and 12e identified as invoices $12d_1$ and $12e_1$. Invoice $12e_1$ is an equivalent of invoice $12d_1$ differing only by native language. (i.e. A (Korean)=Company/Name, B (Korean)=Address, (Korean)=Invoice/Date, D (Korean)=Product, etc.). Arabic numeral normalization between native domains has virtually eliminated effects of language barriers between registered native users for$_1$ business transactions.

Figure 5:
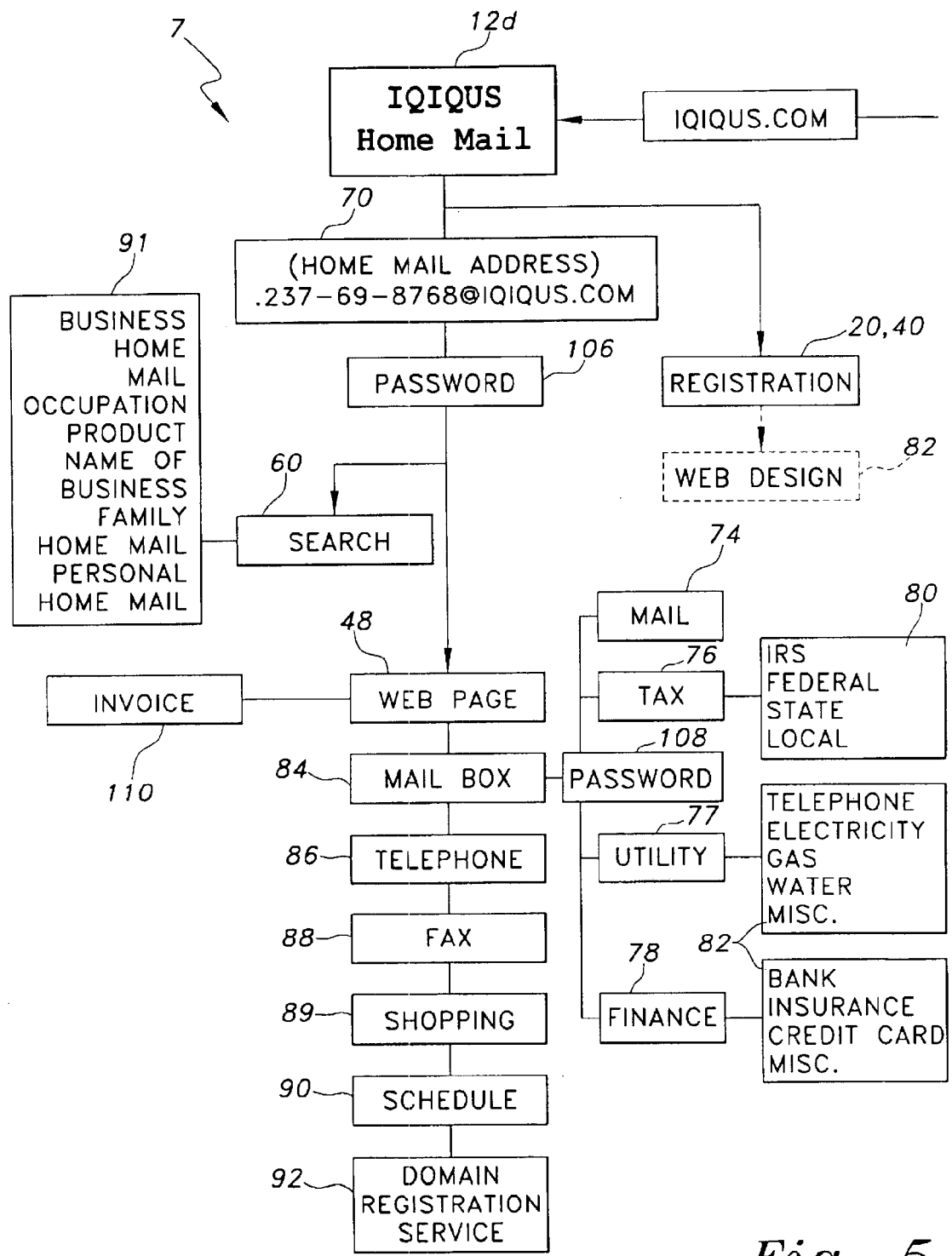
FIG. 5 is a block diagram of the system and method of composing search free e-mail within a US native domain according to a second embodiment Similar reference characters denote corresponding features consistently throughout the attached drawings.

As shown in FIG. 5, a second embodiment 7 of the invention is disclosed having password protective measures 106 and 108 which provide a certain level of security for authorized business transactions. Other features of this embodiment are similar to the first embodiment 6 as shown in FIG. 3, except that web design capability 82 deployed during registration without the need for password authorization required for searching for registered native users. Another variation is indicated by invoice 110 transactions via the web page 48. Such features are beneficial particularly for business and personal mail setups. Other features such as stock options are other identifiable features available for registered users according to the present invention although such features have not been shown.

Other advantages of the system and method of composing search free mail within an Internet or web-based environment for a variety of native users for domestic and international transmission comprise the general steps of:

(a) registering at least one global host for Internet based applications and a native computer user interface, (b) configuring said host with a plurality of native domains for native user registration, the plurality of domains having a native country code indicator and a common identifier indicative of said at least one global host, (c) providing a mail registering procedure for native user input data, the registering procedure including:
(1) inputting selective native user data, said data being native identifiers comprising a social security number, driver's license number, EIN number and a telephone number,
(2) designating and/or inputting a country,
(3) designating and/or inputting at least one business name, and
(4) inputting personal native information of sex, age occupation, annual income and a hobby, (d) providing a mail registering confirmation procedure for native user input data, the confirmation registering procedure including:
(1) selecting between two alternatives yes or no for confirming native number inputs according to the providing step (c) (1),
(2) inputting a password according to a predetermined number of characters,
(3) re-entering password to confirm (e) determining a home mail address and obtaining a mail box germane to a native domain of said plurality of native domains, wherein said domain has an identifier portion common to said at least one global host, (f) entering a webpage related to said home mail address of the determining step (e).

(g) providing a searching procedure for locating data on a native user, said searching procedure includes:
(1) inputting data for an occupation and a business
(2) inputting at least one native identifier.

(h) providing search results.

The method of composing search free mail according to according to step (b) is at least one of a home mail, personal mail and family mail domain. The entering step (f) further comprises decoupled links or steps for:

(f) (1) entering a web design page, (f) (2) entering a telephone page, (f) (3) entering a facsimile page, (f) (4) entering a shopping page, (f) (5) entering a scheduling page.

Other alternatives to the method of composing search free mail within an Internet or web-based environment for a variety of native users for domestic and international transmission include the steps of:

(a) registering at least one global host for Internet based applications and a native computer user interface, (b1) configuring said host with a plurality of native domains for native user registration, the plurality of domains having a native country code indicator and a common identifier indicative of said at least one global host, and (b2) selectively linking at least two of said plurality of native domains for normalized business transactions, said transactions being decoded normalized data such that said transaction between two distinct native domains is independent of native language.

(c) providing a mail registering procedure for native user, input data, the registering procedure including:
(1) inputting selective native user data, said data being native identifiers comprising a social security number, driver's license number, EIN number and a telephone number,
(2) designating and/or inputting a country,
(3) designating and/or inputting at least one business name, and
(4) inputting personal native information of sex, age occupation, annual income and a hobby, (d) providing a mail registering confirmation procedure for native user input data, the confirmation registering procedure including:
(1) selecting between two alternatives yes or no for confirming native number inputs according to the providing step (c) (1),
(2) inputting a password according to a predetermined number of characters,
(3) re-entering password to confirm (e) determining a home mail address and obtaining a mail box germane to a native domain of said plurality of native domains, wherein said domain has an identifier portion common to said at least one global host, (f) entering a webpage related to said home mail address of the determining step (e).
(g) providing a searching procedure for locating data on a native user, said searching procedure includes:
   (1) inputting data for an occupation and a business
   (2) inputting at least one native identifier.
(h) providing search results. The method of composing search free mail according to steps (b1) and (b2) is at least one of a home mail, personal mail and family mail domain, and provides a single communication link or point for government and private industry transmissions, said transmissions include mail, tax, utility and finance data transmissions. The determining step (e) further can further include password protection entry to the single communication link or point for selective data transmissions as similarly addressed above. For native language differences the selective step (b2) can include normalized decoding of business transactions between at least to distinct native domains via arabic numbers.

It is to be understood that the present invention is not limited to the embodiments described above, but-encompasses any and all embodiments within the scope of the following claims.

I claim:

1. A method of composing search free mail within an Internet or web-based environment for a variety of native users for domestic and international transmission comprising the steps of:
   (a) registering at least one global host for Internet based applications and a native computer user interface,
   (b) configuring said host with a plurality of native domains for native user registration, the plurality of domains having a native country code indicator and a common identifier indicative of said at least one global host,
   (c) providing a mail registering procedure for native user input data, the registering procedure including:
      (1) inputting selective native user data, said data being native identifiers comprising a social security number, driver's license number, EIN number and a telephone number,
      (2) designating and/or inputting a country,
      (3) designating and/or inputting at least one business name, and
      (4) inputting personal native information of sex, age occupation, annual income and a hobby,
   (d) providing a mail registering confirmation procedure for native user input data, the confirmation registering procedure including:
      (1) selecting between two alternatives yes or no for confirming native number inputs according to the providing step (c) (1),
      (2) inputting a password according to a predetermined number of characters,
      (3) re-entering password to confirm
   (e) determining a home mail address and obtaining a mail box germane to a native domain of said plurality of native domains, wherein said domain has an identifier portion common to said at least one global host,
   (f) entering a webpage related to said home mail address of the determining step (e).

2. The method of composing search free mail according to claim 1, further comprising the steps of:
   (g) providing a searching procedure for locating data on a native user, said searching procedure includes:
      (1) inputting data for an occupation and a business
      (2) inputting at least one native identifier.
   (h) providing search results.

3. The method of composing search free mail according to claim 1, wherein said plurality of native domains according to step (b) is at least one of a home mail, personal mail and family mail domain.

4. The method of composing search free mail according to claim 1, wherein said entering step (f) further comprises decoupled links or steps to:
   (f) (1) entering a web design page,
   (f) (2) entering a telephone page,
   (f) (3) entering a facsimile page,
   (f) (4) entering a shopping page,
   (f) (5) entering a scheduling page.

5. A method of composing search free mail within an Internet or web-based environment for a variety of native users for domestic and international transmission comprising the steps of:
   (a) registering at least one global host for Internet based applications and a native computer user interface,
   (b1) configuring said host with a plurality of native domains for native user registration, the plurality of domains having a native country code indicator and a common identifier indicative of said at least one global host, and (b2) selectively, linking at least two of said plurality of native domains for normalized business transactions, said transactions being decoded normalized data such that said transaction between two distinct native domains is independent of native language.
   (c) providing a mail registering procedure for native user input data, the registering procedure including:
      (1) inputting selective native user data, said data being native identifiers comprising a social security number, driver's license number, EIN number and a telephone number,
      (2) designating and/or inputting a country,
      (3) designating and/or inputting at least one business name, and
      (4) inputting personal native information of sex, age occupation, annual income and a hobby,
   (d) providing a mail registering confirmation procedure for native user input data, the confirmation registering procedure including:
      (1) selecting between two alternatives yes or no for confirming native number inputs according to the providing step (c) (1),
      (2) inputting a password according to a predetermined number of characters,
      (3) re-entering password to confirm
   (e) determining a home mail address and obtaining a mail box germane to a native domain of said plurality of native domains, wherein said domain has an identifier portion common to said at least one global host,
   (f) entering a webpage related to said home mail address of the determining step (e).

6. The method of composing search free mail according to claim 5, further comprising the steps of:
   (g) providing a searching procedure for locating data on a native user, said searching procedure includes:
      (1) inputting data for an occupation and a business
      (2) inputting at least one native identifier,
   (h) providing search results.

7. The method of composing search free mail according to claim 5, wherein said plurality of native domains according to steps (b1) and (b2) is at least one of a home mail, personal mail and family mail domain.

8. The method of composing search free mail according to claim 5, wherein said entering step (f) further comprises decoupled links or steps to:

(f) (1) entering a web design page, (f) (2) entering a telephone page, (f) (3) entering a facsimile page, (f) (4) entering a shopping page, (f) (5) entering a scheduling page.

9. The method of composing search free mail according to claim 5, wherein said determining (e) further comprises the step of providing a single communication link or point for government and private industry transmissions, said transmissions include mail, tax, utility and finance data transmissions.

10. The method of composing search free mail according to claim 9, wherein said determining step (e) further comprises the step of providing a password protection entry to said single communication link or point for selective data transmissions from government and private industry entities.

11. The method of composing search free mail according to claim 5, wherein said selective step (b2) normalized decoding of business transactions between at least to distinct native domains via arabic numbers.

* * * * *